(12) United States Patent
Krichever et al.

(10) Patent No.: US 6,568,597 B2
(45) Date of Patent: May 27, 2003

(54) SCANNING SYSTEM WITH ADJUSTABLE OPTICAL CHARACTERISTICS

(75) Inventors: Mark Krichever, Hauppauge, NY (US); Joseph Katz, Stony Book, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 90 days.

(21) Appl. No.: 09/726,134

(22) Filed: Nov. 29, 2000

(65) Prior Publication Data

US 2002/0063160 A1 May 30, 2002

(51) Int. Cl.$^7$ ................................................ G06K 7/10
(52) U.S. Cl. ............................ 235/462.32; 235/462.01; 235/462.06; 235/462.23
(58) Field of Search ..................... 235/462.01, 462.45, 235/454, 472.01, 435, 455, 462.06, 462.32, 462.21, 462.22, 462.23, 462.24

(56) References Cited

U.S. PATENT DOCUMENTS

| | | | |
|---|---|---|---|
| 3,164,665 A | * 1/1965 | Stello | 455/609 X |
| 3,982,817 A | 9/1976 | Feichtner | 350/149 |
| 4,676,642 A | 6/1987 | French | 356/346 |
| 5,117,126 A | 5/1992 | Geiger | 359/330 |
| 5,173,794 A | * 12/1992 | Cheung et al. | |
| 5,305,402 A | 4/1994 | Hill et al. | 385/25 |
| 5,307,366 A | 4/1994 | Auffret et al. | 372/96 |
| 5,432,638 A | 7/1995 | Rahmlow | 359/588 |
| 5,483,387 A | * 1/1996 | Bauhahn et al. | 359/885 |
| 6,029,894 A | * 2/2000 | Amundsen et al. | 235/472.01 |
| 6,141,033 A | * 10/2000 | Michael et al. | 348/25 |
| 6,209,789 B1 | * 4/2001 | Amundsen et al. | 235/472.01 |
| 6,239,893 B1 | * 5/2001 | Bigo et al. | 359/176 |
| 6,279,829 B1 | * 8/2001 | Hems et al. | 235/462.01 |
| 6,327,287 B1 | * 12/2001 | Kner et al. | 372/43 |
| 6,339,492 B1 | * 1/2002 | Terahara et al. | 359/283 |

FOREIGN PATENT DOCUMENTS

EP 0 377 973 A2 * 12/1989 ............ G06K/7/10

OTHER PUBLICATIONS

Coretek Inc. Preliminary Data Sheet DS00554 dated May 2000.
Coretek Inc. Preliminary Data Sheet DS00553 dated May 2000.

* cited by examiner

*Primary Examiner*—Michael G. Lee
*Assistant Examiner*—Daniel Hess
(74) *Attorney, Agent, or Firm*—Kirschstein, et al.

(57) ABSTRACT

An optical scanner for scanning various optical indicia uses one or more tunable optical components for noise reduction purposes. The scanner may include a narrow band-pass tunable optical filter for passing selected wavelengths of incoming light. The scanner may also have a tunable light source, such as a tunable laser source, whereby the wavelength of the generated laser light is sensed and controlled by the scanner's electronic sub-system.

26 Claims, 7 Drawing Sheets

SCANNING SYSTEM WITH ADJUSTABLE OPTICAL CHARACTERISTICS

FIELD OF THE INVENTION

This invention relates to the field of optical scanners such as bar code scanners. More specifically, the invention relates to the use of tunable optical components for noise reduction within optical scanners.

BACKGROUND OF THE INVENTION

Electro-optical scanners, such as bar code symbol scanners, are now quite common. Typically, a bar code symbol comprises one or more rows of light and dark regions, typically in the form of rectangles. The widths of the dark regions, i.e., the bars, and/or the widths of the light regions, i.e., the spaces between the bars, when partitioned into groups, indicate encoded information to be read.

A bar code symbol reader illuminates the symbol and senses light reflected from the coded regions to detect the widths and spacings of the coded regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, i.e., bar code symbols, particularly of the Universal Product Code (UPC) type, at a certain working range or reading distance from a hand-held or stationary scanner.

FIG. 1 illustrates an example of a prior art bar code symbol reader 10 implemented as a gun shaped device, having a pistol-grip type of handle 53. A lightweight plastic housing 55 contains a light source 46, a detector 58, optics 57, signal processing circuitry 63, a programmed microprocessor 40, and a power source or battery 62. An exit window 56 at the front end of the housing 55 allows an outgoing light beam 51 to exit and an incoming reflected light 52 to enter. A user aims the reader at a bar code symbol 70 from a position in which the reader 10 is spaced from the symbol, i.e., not touching the symbol or moving across the symbol.

As further depicted in FIG. 1, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted.

The light 52 reflected back by the symbol 70 passes back through the window 56 for transmission to the detector 58. In the exemplary reader shown in FIG. 1, the reflected light reflects off of mirror 59, passes through an optical filter 47 and impinges on the light sensitive detector 58. The filter is typically designed to have a band-pass characteristics in order to pass the reflected (return) laser light and block the light coming from other light sources. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light maybe included. The aiming light, if needed, produces a visible-light spot which may be fixed, or scanned just like the laser beam 51. The user employs this visible light to aim the reader at the symbol before pulling the trigger.

The reader 10 may also function as a portable data collection terminal. If so, the reader would include a keyboard 48 and a display 49, such as described in the previously noted U.S. Pat. No. 4,409,470.

In electro-optical scanners of the type discussed above, the laser source, the optics, the mirror structure, the drive to oscillate the mirror structure, the photodetector, and the associated signal processing and decoding circuitry can all be packaged in a "scanning module", which in turn is placed into the scanner's, or terminal's housing.

One of the factors which can affect scanner's performance is it's signal-to-noise ratio. The signal-to-noise ratio can be separated into two components, optical and electrical. The optical signal-to-noise ratio depends upon the amount of the reflected diffused laser light detected by the sensor 58, verses the amount of parasitic light impinging upon the sensor 58 which comes from other light sources such as an ambient light. In order to increase the optical signal-to-noise ratio, the band-pass filter is designed to transmit in the spectrum of the laser source and to block the light in other optical spectrums. A typical bandwidth of the optical filter used in bar code scanners is approximately 70 nanometers. In comparison, a typical bandwidth of a laser beam generated by a laser diode is on the order of few nanometers. The large difference between the filter bandwidth and the laser beam bandwidth is due to a number of variables.

The optical filter has to accommodate laser wavelength variations, as well as the laser wavelength changes due to temperature. In addition sufficient bandwidth must be allocated for filter variations and filter slope roll-off.

Therefore, a need exists for a scanner having very narrow optical band-pass filter. This would increase the scanner's signal-to-noise ratio and improve the system's performance in high optical noise environments.

The need also exists for a method of making a scanner having a narrow optical band-pass filter which would accommodate laser wavelength variations.

There is also a need for a scanner having a narrow band-pass optical filter which is capable of adjusting its filtering characteristics in order to track the laser wavelengths variations.

There is a further need for a scanner capable of controlling laser wavelengths, thus allowing the use of a non-tunable or partly tunable narrow band-pass optical filter.

Solutions for the above objects of the invention are fully disclosed in the drawings and the following pages of the specification.

SUMMARY OF THE INVENTION

These and other objects of the present invention are achieved in accordance with the present invention by a barcode reader and a method for reading barcodes in accordance with the present invention.

The barcode reader in one embodiment comprises a light source for generating a barcode illuminating beam and a detector for detecting return light reflected from a barcode illuminated by the illuminating beam and producing a signal corresponding thereto. A tunable optical filter is disposed before the detector to filter the return light. The tunable optical filter has an adjustable filtering characteristic that is adjustable to maximize the signal-to-noise ratio of the detector and thereby the barcode reader.

The light source is preferably a monochromatic light source, and most preferably, a laser light source. The tunable optical filter can be an interference type optical filter and preferably has a light collimator located in front of the filter to provide a collimated return light to the optical filter.

The filtering characteristic of the filter can be adjusted by changing an angle of incidence of the return light with respect to the optical filter. The optical filter is most preferably a band-pass tunable optical filter with a band-pass filtering characteristic, and in a preferred embodiment, the interference type optical filter includes interference coating layers preferably having a plurality of coating layers on one side of the optical filter.

In a preferred embodiment, the plurality of interference coating layers is separated into sets of layers, and one set of layers is located on one side of the optical filter, and another set of layers is located on the other side of the optical filter.

In one embodiment, the angle of incidence of return light is changed by an adjuster, which can be either passive or active. The passive adjuster is preferably a temperature sensitive bimetallic spring, and a preferred embodiment of an active adjuster is a sensor for sensing the temperature of the light source and an actuator for positioning the optical filter at an angle that increases the signal-to-noise ratio of the barcode reader.

The active adjuster can further include a lookup table for correlating a set of angular positions of the optical filter to a set of temperatures for the light source. The active adjuster can be an analog electromechanical adjuster.

In another embodiment, the active adjuster can sense the wavelength of the laser beam, and an actuator positions the optical filter at an angle that increases the signal-to-noise ratio based on the sensed wavelength. This can also be carried out by using a lookup table for correlating a set of angular positions to a set of wavelengths.

The tunable optical filter can also be an LCD type optical filter, an acoustic type optical filter, or a diffractive type optical filter.

In another embodiment of the present invention, in addition to the light source, detector and an optical filter, the reader has a controller for adjusting the wavelength of the illuminating beam to maximize the signal-to-noise ratio of the signal produced by the detector. In this embodiment, the optical filter has a static characteristic, whereas the wavelength of the light source is modulated by varying the temperature or the current to the light source. Alternatively, both the current and the temperature to the light source can be varied to adjust the wavelength of the beam.

The present invention also relates to methods for reading barcodes which include the steps of adjusting the filtering characteristic of a tunable filter to maximize signal-to-noise ratio, adjusting the filtering characteristic of the optical filter by changing the angle of incidence of the return light in order to increase the signal ratio, or controlling the wavelength of the illuminating beam to maximize the signal-to-noise ratio of the reader.

These and other features and advantages of the present invention will become more apparent from the detailed description of the invention taken with the attached drawings, wherein:

DETAILED DESCRIPTION OF THE INVENTION

Figure 1:
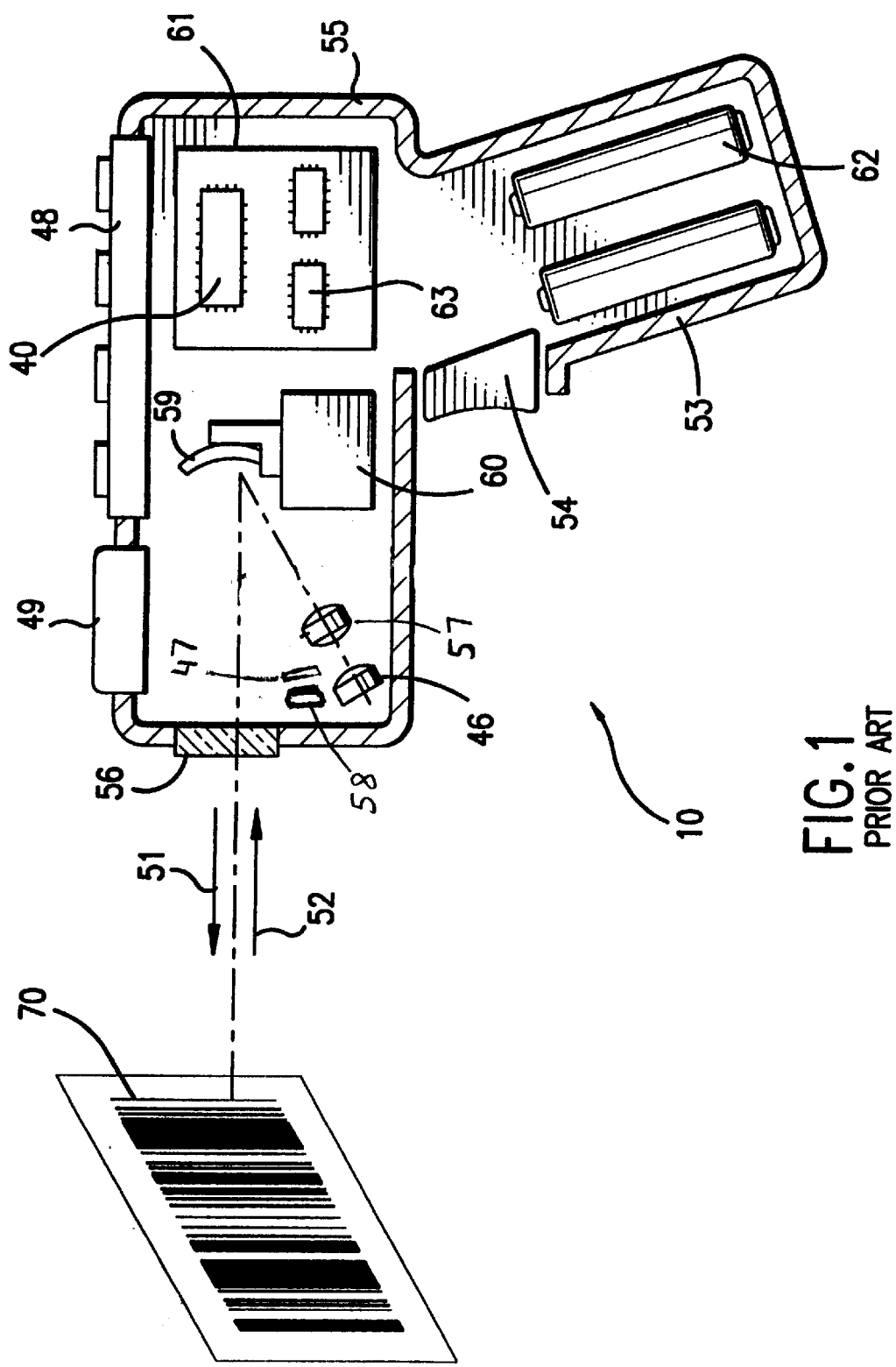
FIG. 1 illustrates a prior art optical scanner.
Figure 2:
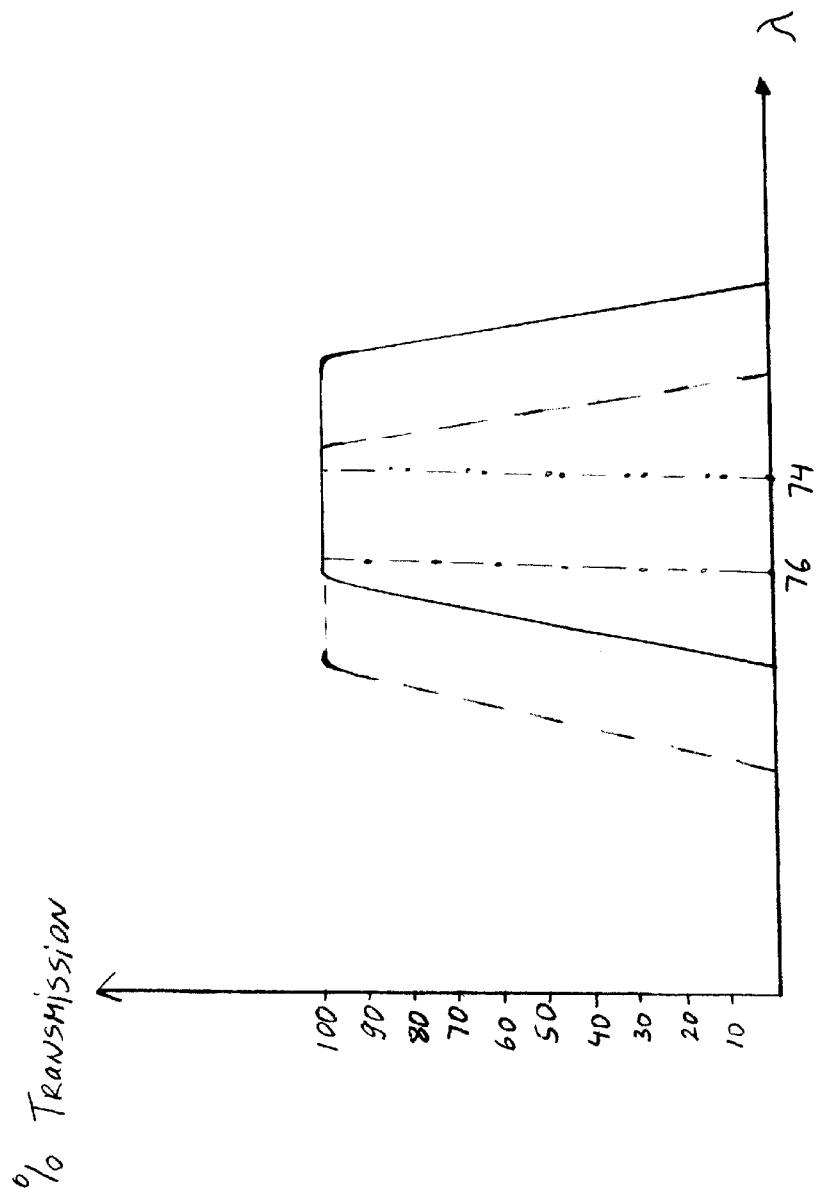
FIG. 2 illustrates filtering characteristics of a tunable band-pass filter.

Referring now to FIG. 2, the filtering characteristics of a tunable band-pass filter in accordance with the present invention is shown. For barcode scanners, the bandwidth of the optical band-pass filter is a critical parameter to limit the amount of ambient noise getting into the electric optical system, which significantly impacts scanner performance. For conventional optical band-pass filters, the determination of the bandwidth will be based on the laser wavelength variation of the laser diode, the laser wavelength shift due to temperature range, the numerical aperture of collection optics and the tolerances of either front or back slope of the filter. To cover all of these major variables, the bandwidth of the optical band-pass filter is very difficult to be reduced.

Since the laser diode is a very good coherent light source, this means that the optical spectrum of the laser wavelength is very narrow, usually less than a manometer. The optical band-pass filter, according to the present invention, has dielectric coatings coated on both sides of the optical transparent substrate, for example, float glass, to compose the optical spectrum bandwidth. The bandwidth is measured by the laser coherency plus the numerical aperture of collection optics. The spectrum location of such bandwidth can be tuned to cover the actual laser wavelength. Thus, as shown in FIG. 2, the filtering characteristic 70 of the band-pass filter can be tuned to vary from a center wavelength 74 to a characteristic 72 having a center wavelength 76.

Figure 4:
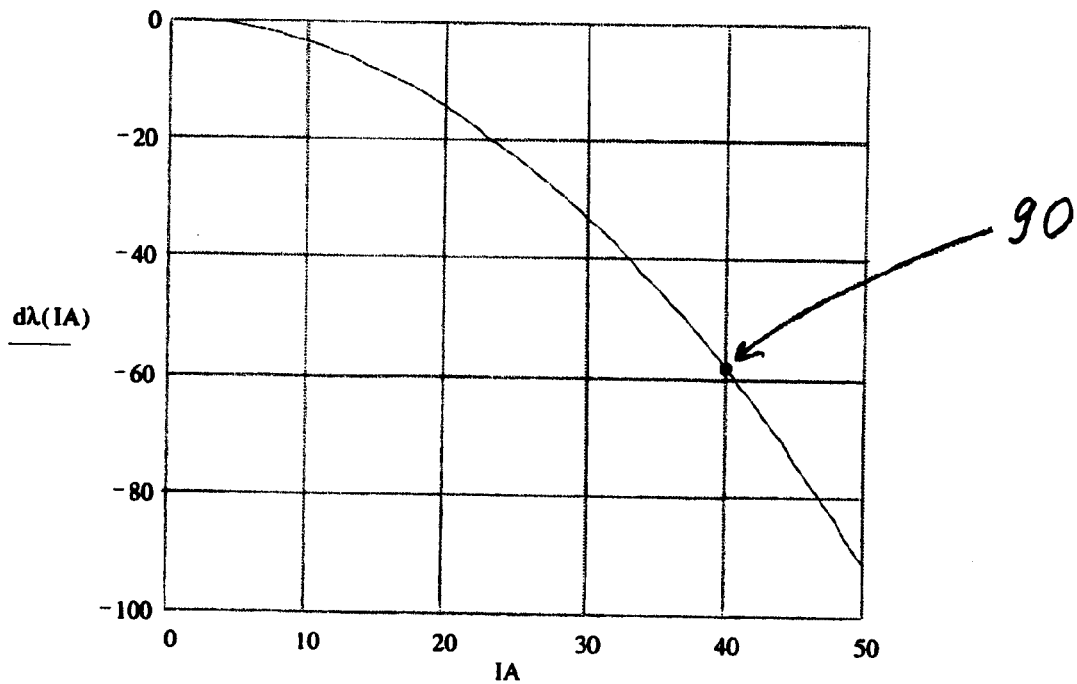
FIG. 4 illustrates a shift in special transmission characteristic of an interference filter as a function of an angle of incidence of the incoming light.

The tuning method can be either mechanical or optical. For example, changing the incident angle of the laser beam to the optical band-pass filter can shift the bandwidth spectrum location. This shift is illustrated in FIG. 4, which shows the characteristic of an interference filter as a function of an angle of incidence of the incoming light. Reference numeral 90 points to a location on the filter transmission curve where a change if 40 degrees in the angle of incidence produces approximately 60% reduction in the filter transmission characteristic at a particular wavelength.

Alternatively, the dielectric coding layer structure materials can be changed to achieve the same optical spectrum temperature shift for the optical band-pass filter as for the laser wavelength of laser diode. This shift is shown in FIG. 2.

Figure 3:
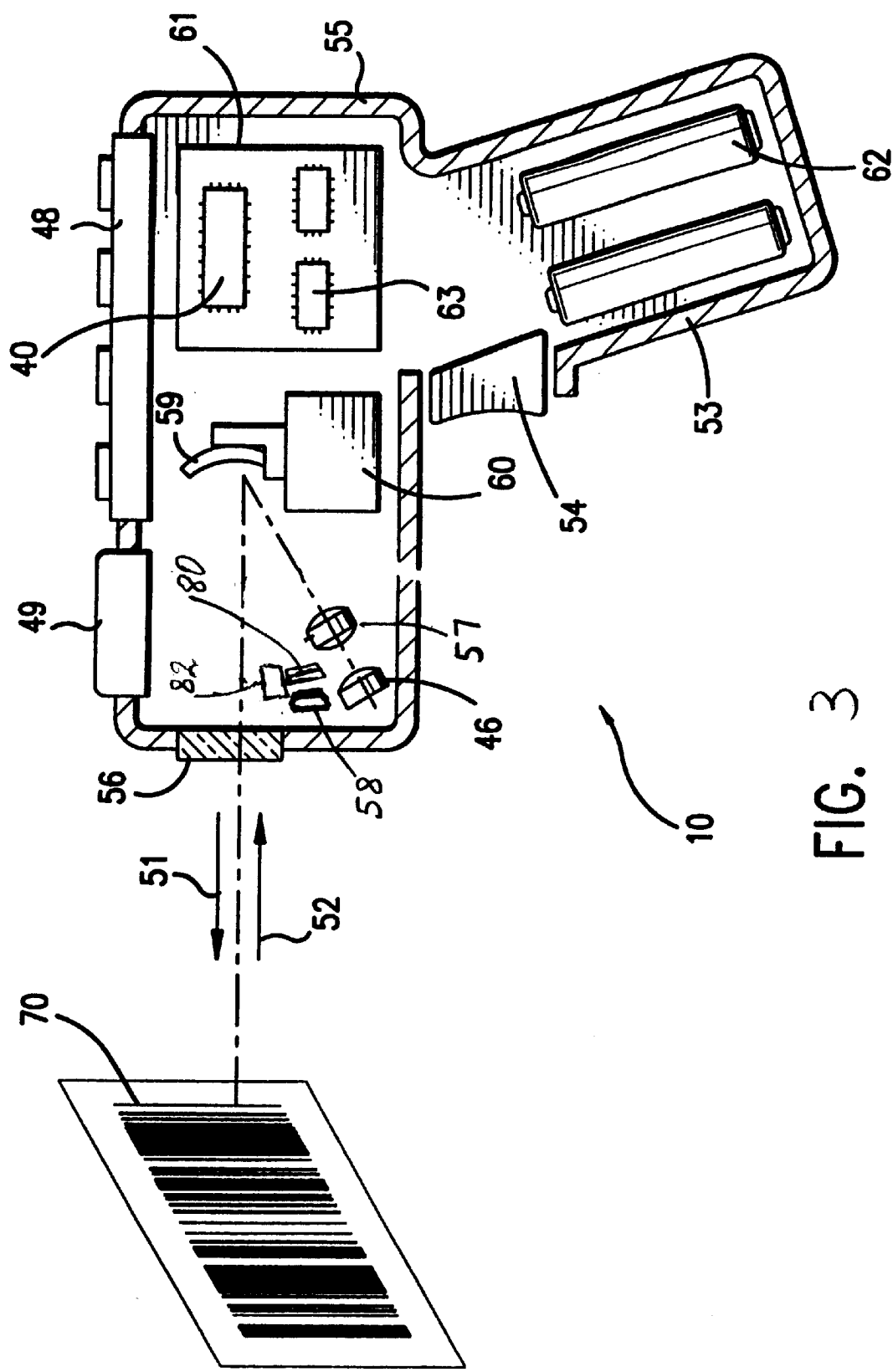
FIG. 3 illustrates an optical scanner having a tunable band-pass optical filter according to the preferred embodiment of the invention.

FIG. 3 illustrates the scanner having the tunable band-pass optical filter 80 controlled by a controller 82 for changing the angle of the filter. The tunable band-pass filter of FIG. 3 is shown in more detail in FIG. 5.

As shown therein, a collimator 96 is preferably placed in front of the interference filter 81 to provide a collimated return light to the optical filter. The collimated light 95 is passed to the filter 81, which can be shifted by an angle a from the position 98 to the position 97, which shifts the filtering characteristic of the filter and thus maximizes the light returned to detector 58, which produces an electrical signal 102 having a maximized signal to noise ratio.

Figure 5:
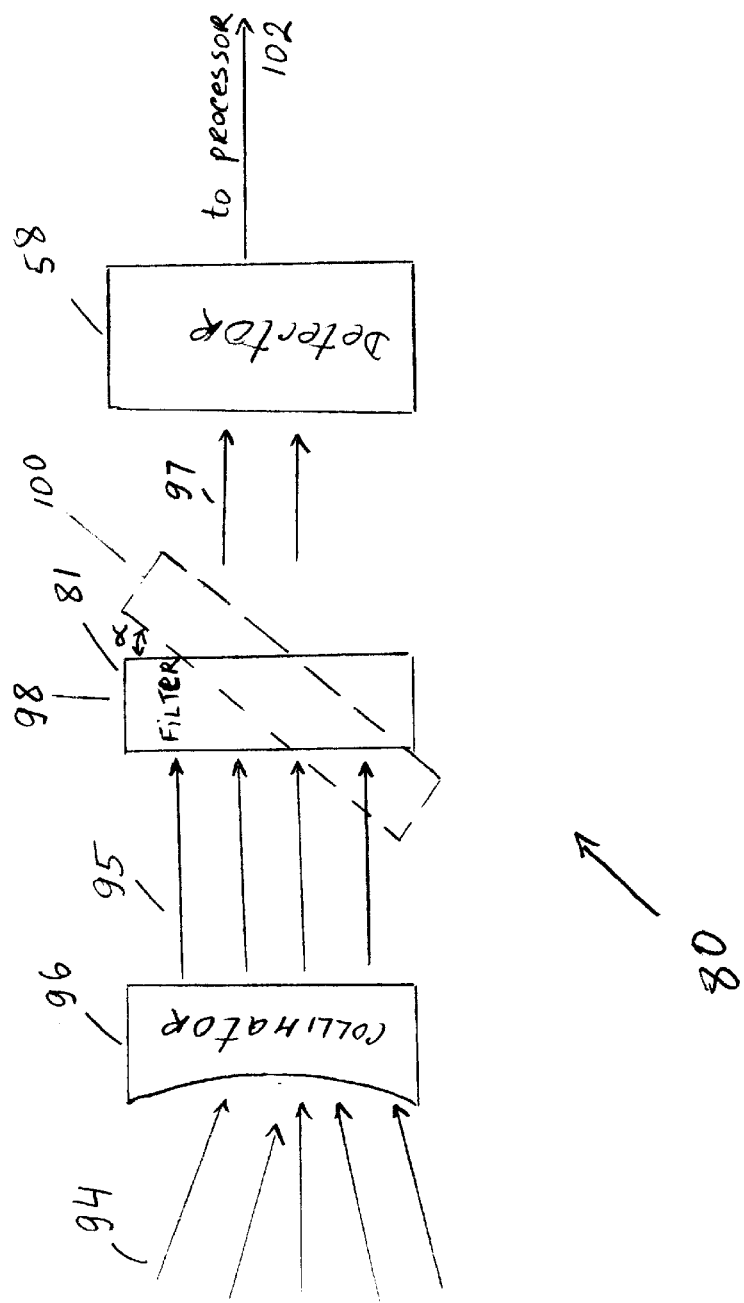
FIG. 5 illustrates an optical subsystem utilizing a tunable interference band-pass filter.

The filter 81 shown in FIG. 5 preferably has layers of interference coating on at least one side thereof. The adapter 82 changes the angle of incidence of the filter either passively or actively. For example, the adapter 82 can be a temperature sensitive bimetallic spring and passively adjusts the angle. Adapter 82 can be an active adjuster, and for example, be a sensor for sensing the temperature of the light source and an actuator for moving the filter between the positions shown. The sensor can also sense the wavelength of the laser beam and alter the position of the filter as shown. The adapter 82 can also include a lookup table for correlating angular positions to temperatures or wavelengths as described above.

Figure 6:
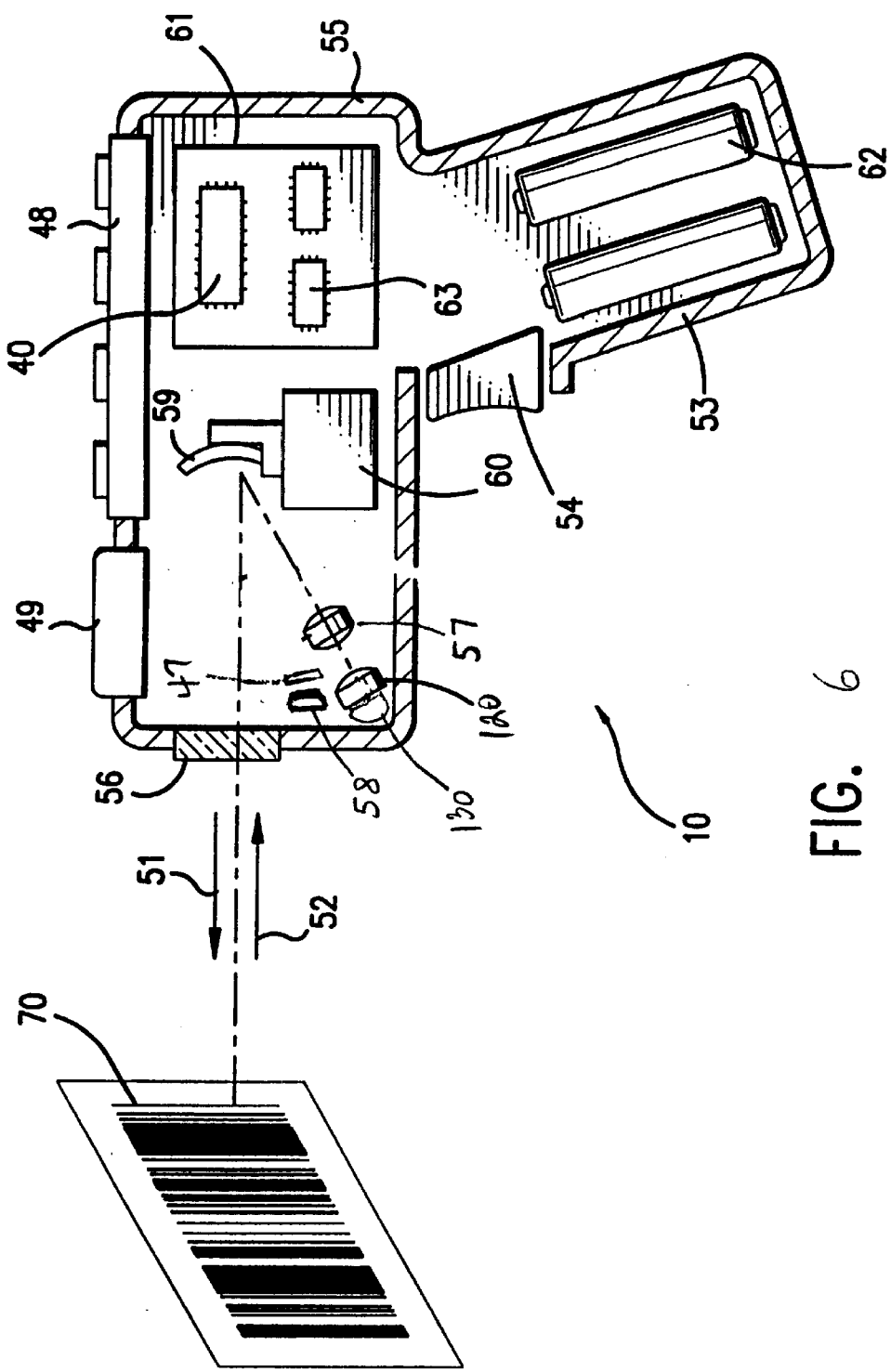
FIG. 6 illustrates an optical scanner having a tunable laser source according to the preferred embodiment of the invention.

FIG. 6 shows an alternative embodiment of the present invention wherein the light source 120 is tunable and has an apparatus for controlling the wavelength of the light source.

Figure 7:
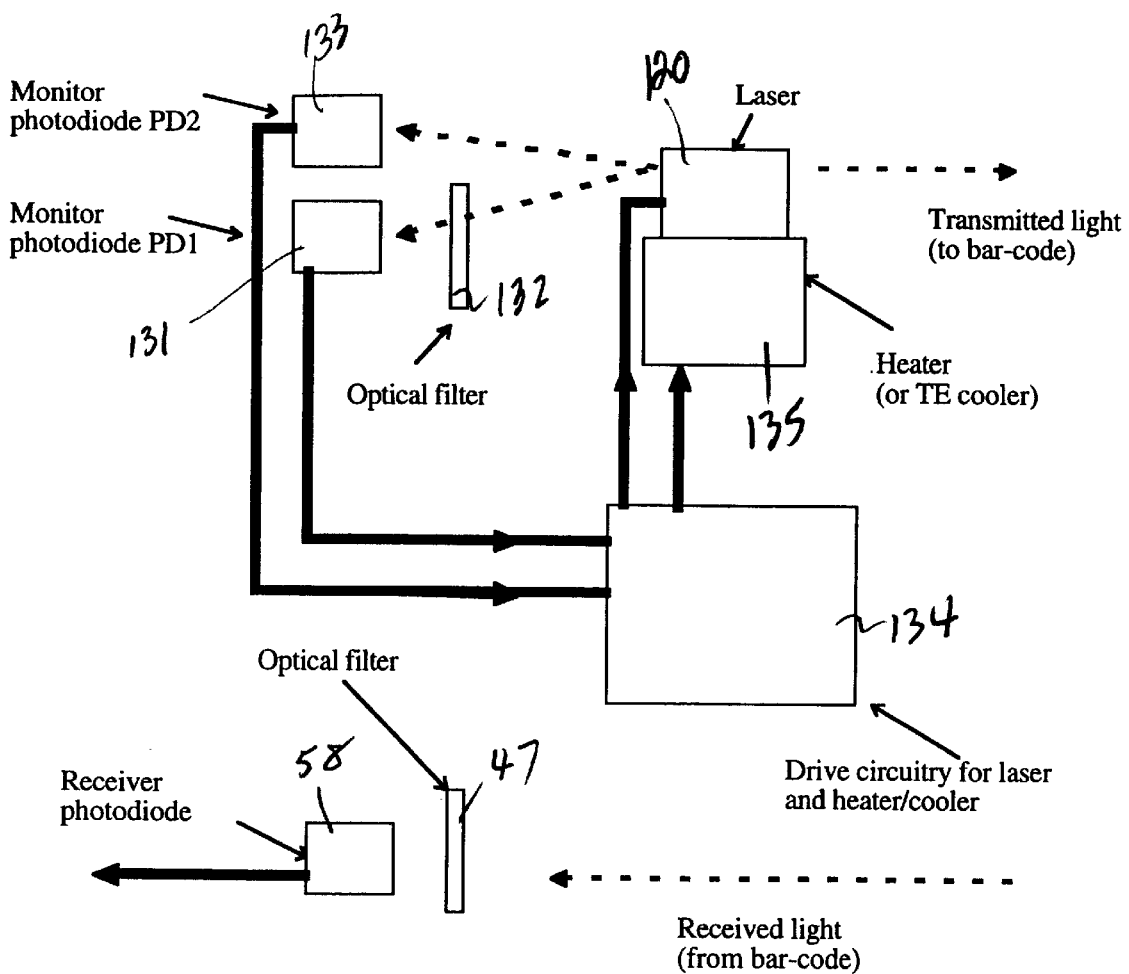
FIG. 7 illustrates an electro-optical subsystem for controlling the wavelength of a laser source.

FIG. 7 illustrates the subsystem 130 for controlling the wavelength of the laser source.

In the system shown in FIG. 7, the wavelength of the laser 120 is modified by a combination of temperature and current modulation by maximizing the output of a first monitoring photodiode 131, which receives its light through an optical filter 132, which is identical to the filter 47 placed before the detector 58. The maximizing of the output of photodiode 131 is subject to maintaining a safe level of output radiation through a second monitoring photodiode 133. Drive circuitry 134 receives the signals from diodes 131 and 133 and controls the current to laser 120 and controls the temperature of the laser via a heater/cooler 135 in contact with the laser 120.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A bar code reader comprising:
   a) a light source for generating an illuminating beam directed to a bar code for reflection therefrom;
   b) a tunable optical filter for passing a return light reflected from the bar code, said tunable optical filter having an adjustable filtering characteristic;
   c) a detector for detecting the return light transmitted through said optical filter in the presence of ambient light surrounding the reader; and
   d) a controller for adjusting said filtering characteristic during reading of the bar code to increase a signal-to-noise ratio of the detected return light relative to the ambient light.

2. The bar code reader of claim 1, wherein said light source is a monochromatic light source.

3. The bar code reader of claim 2, wherein said light source is a laser light source, and wherein said illuminating beam is a laser beam.

4. The bar code reader of claim 1, wherein said tunable optical filter is an interference-type optical filter.

5. The bar code reader of claim 4, further including a light collimator located in front of said optical filter and in a path of the return light for modifying the return light and for providing a collimated return light to said optical filter.

6. The bar code reader of claim 4, wherein said controller is operative for adjusting said filtering characteristic by changing an angle of incidence of the return light with respect to said optical filter.

7. The bar code reader of claim 6, wherein said controller includes an adjuster for changing the angle of incidence of the return light with respect to said interference-type optical filter.

8. The bar code reader of claim 7, wherein said adjuster is passive.

9. The bar code reader of claim 8, wherein said passive adjuster is a temperature sensitive bimetallic spring.

10. The bar code reader of claim 7, wherein said adjuster is an active adjuster.

11. The bar code reader of claim 10, wherein said active adjuster includes:
   a) a sensor for sensing a temperature of said light source; and
   b) an actuator for positioning said optical filter at an angle which increases the signal-to-noise ratio of said bar code reader based on the sensed temperature.

12. The bar code reader of claim 11, wherein said active adjuster further includes a look-up table for correlating a set of angular positions of said optical filter to a set of temperatures of said light source.

13. The bar code reader of claim 11, wherein said active adjuster is an analog electromechanical adjuster.

14. The bar code reader of claim 10, wherein said active adjuster includes:
   a) a sensor for sensing a wavelength of said laser beam; and
   b) an actuator for positioning said optical filter at an angle which increases the signal-to-noise ratio of said bar code reader based on the sensed wavelength.

15. The bar code reader of claim 14, wherein said active adjuster further includes a look-up table for correlating a set of angular positions of said optical filter to a set of wavelengths of said illuminating beam.

16. The bar code reader of claim 14, wherein said active adjuster is an analog electromechanical adjuster.

17. The bar code reader of claim 4, wherein said interference-type optical filter includes a plurality of interference-coating layers.

18. The bar code reader of claim 17, wherein said plurality of interference-coating layers is located on a first side of said optical filter.

19. The bar code reader of claim 17, wherein said plurality of interference-coating layers is separated into two sets of layers, and wherein a first set of layers is located on a first side of said optical filter, and wherein a second set of layers is located on a second side of said optical filter.

20. The bar code reader of claim 1, wherein said tunable optical filter is a band-pass tunable optical filter, and wherein said filtering characteristic is a band-pass filtering characteristic.

21. The bar code reader of claim 1, wherein said tunable optical filter is an LCD-type optical filter.

22. The bar code reader of claim 1, wherein said tunable optical filter is an acoustic-type optical filter.

23. The bar code reader of claim 1, wherein said tunable optical filter is a diffractive-type optical filter.

24. A method of reading a bar code, comprising the steps of:
   a) generating an illuminating beam;
   b) illuminating the bar code with said beam for reflection therefrom;
   c) passing a return light reflected from the illuminated bar code through a tunable optical filter having an adjustable filtering characteristic;
   d) detecting the return light passed through said tunable optical filter the presence of ambient light; and
   e) adjusting the filtering characteristic of said tunable optical filter during reading of the bar code to increase a signal-to-noise ratio of the detected return light relative to the ambient light.

25. A method of using an optical reader, comprising the steps of:
   a) generating an illuminating beam using a light;
   b) illuminating a bar code with said illuminating beam;
   c) passing a return light reflected from the illuminated bar code through a tunable optical filter having a filtering characteristic which varies with an angle of incidence of the return light to said optical filter;
   d) detecting an intensity of the return light passed through said tunable optical filter; and
   e) adjusting the filtering characteristic of said optical filter during reading of the bar code by changing the angle of incidence of the return light in order to increase a signal-to-noise ratio of said optical reader.

26. A data acquisition device for reading optical indicia, comprising:
   a) a device housing; and
   b) an indicia reading module including
      i) a light source located within said device housing for generating an illuminating beam directed to indicia for reflection therefrom;
      ii) a tunable optical filter located within said device housing for passing a return light reflected from the indicia, said tunable optical filter having a filtering characteristic which varies with an angle of incidence of the return light to said tunable optical filter;
      iii) a detector located within said device housing for detecting the return light passed through said tunable optical filter; and
      iv) a controller for adjusting said filtering characteristic of said tunable optical filter during reading of the indicia by changing the angle of incidence of the return light to said tunable optical filter.

* * * * *